United States Patent
McMillen et al.

(10) Patent No.: US 9,140,277 B2
(45) Date of Patent: Sep. 22, 2015

(54) QUICK-ATTACHING CEILING LEAK DIVERTER DEVICES

(71) Applicant: New Pig Corporation, Tipton, PA (US)

(72) Inventors: Timothy R. McMillen, Tyrone, PA (US); Matthew A. Romito, State College, PA (US)

(73) Assignee: New Pig Corporation, Tipton, PA (US)

( * ) Notice: Subject to any disclaimer, the term of this patent is extended or adjusted under 35 U.S.C. 154(b) by 49 days.

(21) Appl. No.: 14/037,472

(22) Filed: Sep. 26, 2013

(65) Prior Publication Data

US 2014/0083521 A1 Mar. 27, 2014

Related U.S. Application Data

(60) Provisional application No. 61/706,530, filed on Sep. 27, 2012.

(51) Int. Cl.
| | | |
|---|---|---|
| *F15B 20/00* | (2006.01) | |
| *E04B 9/04* | (2006.01) | |
| *F16L 3/14* | (2006.01) | |

(52) U.S. Cl.
CPC ............. *F15B 20/005* (2013.01); *E04B 9/0428* (2013.01); *F16L 3/14* (2013.01); *Y10T 137/5762* (2015.04)

(58) Field of Classification Search
CPC ......... E04B 9/0428; F15B 20/005; F16L 3/14
USPC ..................... 137/312, 357; 52/302.1, 506.06
See application file for complete search history.

(56) References Cited

U.S. PATENT DOCUMENTS

| | | | |
|---|---|---|---|
| 4,245,666 A * | 1/1981 | Norris | 137/357 |
| 4,633,899 A * | 1/1987 | Lord | 137/357 |
| 5,133,167 A | 7/1992 | Drew et al. | |
| 5,172,718 A | 12/1992 | Thornburgh | |
| 5,299,591 A | 4/1994 | Duncan | |
| 6,283,144 B1 | 9/2001 | Kahn | |
| 6,595,482 B1 * | 7/2003 | Armbruster | 248/544 |
| 6,622,750 B1 | 9/2003 | Bergeron | |
| 7,331,357 B2 | 2/2008 | Huff | |
| 2003/0159383 A1 | 8/2003 | Mueller | |
| 2009/0250574 A1 * | 10/2009 | Fullerton et al. | 248/206.5 |
| 2009/0250575 A1 * | 10/2009 | Fullerton et al. | 248/206.5 |
| 2009/0250576 A1 * | 10/2009 | Fullerton et al. | 248/206.5 |
| 2011/0240140 A1 | 10/2011 | McDonald | |
| 2014/0076405 A1 * | 3/2014 | McMillen et al. | 137/1 |

* cited by examiner

*Primary Examiner* — Craig Schneider
*Assistant Examiner* — Kevin Barss
(74) *Attorney, Agent, or Firm* — Robert P. Lenart, Esq.; Pietragallo Gordon Alfano Bosick & Raspanti, LLP

(57) ABSTRACT

A leak diverter includes a liquid collection tray structured and arranged to be positioned below and supported by a suspended ceiling; a drain in flow communication with the liquid collection tray; and a plurality of magnetic suspension assemblies connected to the liquid collection tray, the magnetic suspension assemblies being structured and arranged to magnetically couple the leak diverter to a support frame in the suspended ceiling.

13 Claims, 7 Drawing Sheets

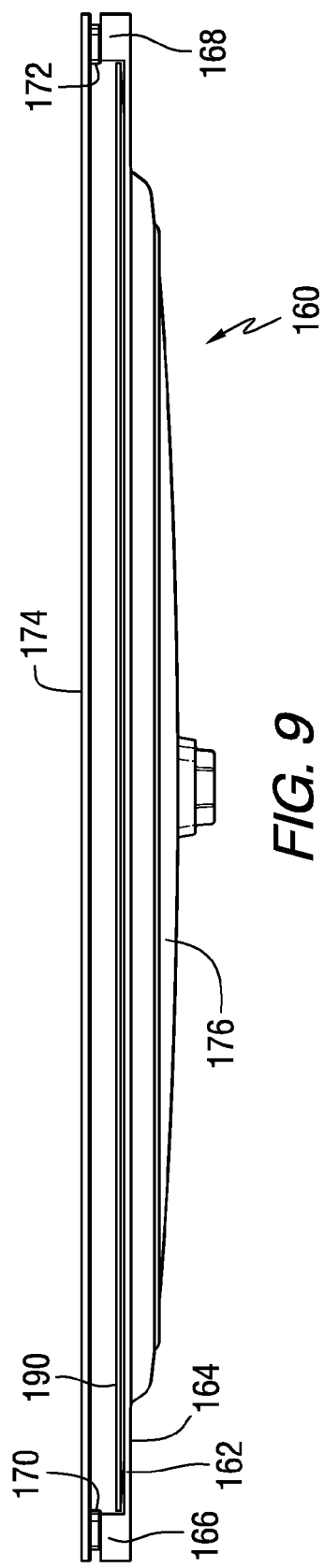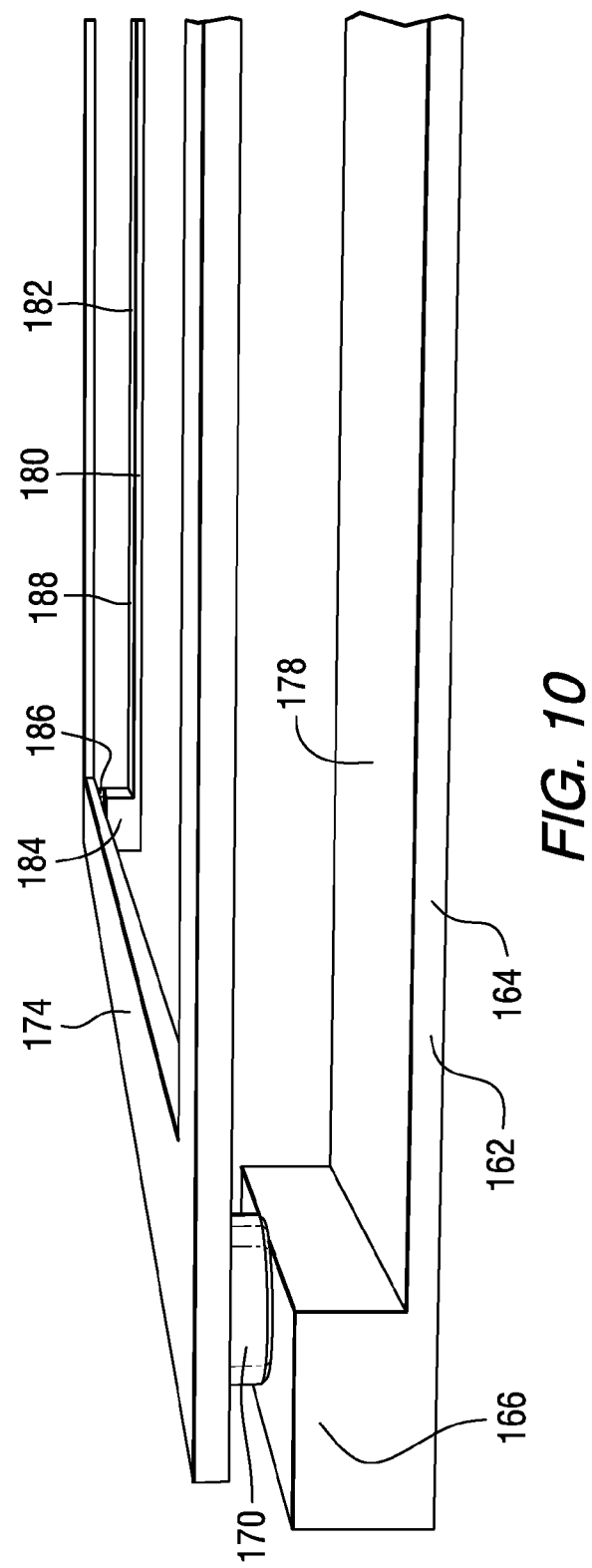

QUICK-ATTACHING CEILING LEAK DIVERTER DEVICES

CROSS-REFERENCE TO RELATED APPLICATION

This application claims the benefit of U.S. Provisional Patent Application Ser. No. 61/706,530, filed Sep. 27, 2012, which is incorporated herein by reference.

FIELD OF THE INVENTION

This invention relates to apparatus for the collection and/or diversion of liquids.

BACKGROUND INFORMATION

Many buildings are constructed to include a suspended ceiling, also known as a drop ceiling. A suspended ceiling typically includes an interconnected support grid and removable ceiling panels, such as acoustic ceiling tiles, positioned in the support grid. Support wires can be used to support the suspended ceiling from a structural building ceiling or roof The support grid can comprise a plurality of support bars intersecting at right angles. A suspended ceiling typically comprises a finished lower surface structured to face into a room interior and be visible to occupants of the room.

In certain situations, liquid, from for example a defective roof, faulty plumbing, or condensation above the suspended ceiling, can pass through the ceiling panels and drip into the interior of a room below the suspended ceiling.

Leak diverters can be used to capture, collect, and redirect liquids leaking onto and through a suspended ceiling system. Common applications include collecting rainwater from a leaking roof or condensation dripping from a pipe, and redirecting the fluids to a container or drain via a hose or tube. These devices typically either capture the liquids above the ceiling tile, or replace a ceiling tile with a leak diverter system. In both of these methods, a hose or tube is attached to carry away the liquid to a more convenient location such as a bucket or drain. These methods require removing tiles, either for replacement or to gain access to the space adjacent to the leak to place a diverter above the grid system.

During a typical leak situation, ceiling tiles need to be removed, usually during an active leak, which can be a messy or unsafe practice. While these types of leaks are typically not disastrous, they can be a nuisance, and response speed and safety can be important. When it comes time to remove the type of diverter unit that replaces a tile (for instance when a final repair is to be made to the leak), the unit needs to be lifted, tilted and cocked to remove it. This can result in liquid that has accumulated in and on the diverter being spilled onto adjacent tiles or onto the person doing the work.

There exists a need for a leak diverter that may be positioned below suspended ceilings and does not require removal or replacement of the existing suspended ceiling components.

SUMMARY OF THE INVENTION

In one aspect, the invention provides a leak diverter including a liquid collection tray structured and arranged to be positioned below and supported by a suspended ceiling; a drain in flow communication with the liquid collection tray; and a plurality of magnetic suspension assemblies connected to the liquid collection tray, the magnetic suspension assemblies being structured and arranged to magnetically couple the leak diverter to a support frame in the suspended ceiling.

In another aspect, the invention provides a leak diverter system including a liquid collection tray structured and arranged to be positioned below and supported by a suspended ceiling; a drain in flow communication with the liquid collection tray; a plurality of attachment devices structured and arranged to attach the liquid collection tray to a support frame in the suspended ceiling; a drain hose connected to the drain; and a hanger structured and arranged to suspend the drain hose from the suspended ceiling, the hanger including a magnet structured and arranged to magnetically couple the hanger to a support frame in the suspended ceiling.

These and other aspects of the present invention will be more apparent from the following description.

BRIEF DESCRIPTION OF THE DRAWINGS

FIG. 9 is a side view of another embodiment of a leak diverter with another magnetic suspension assembly.

FIG. 10 is an isometric view of a portion of the suspension assembly of FIG. 9.

DETAILED DESCRIPTION

Figure 1:
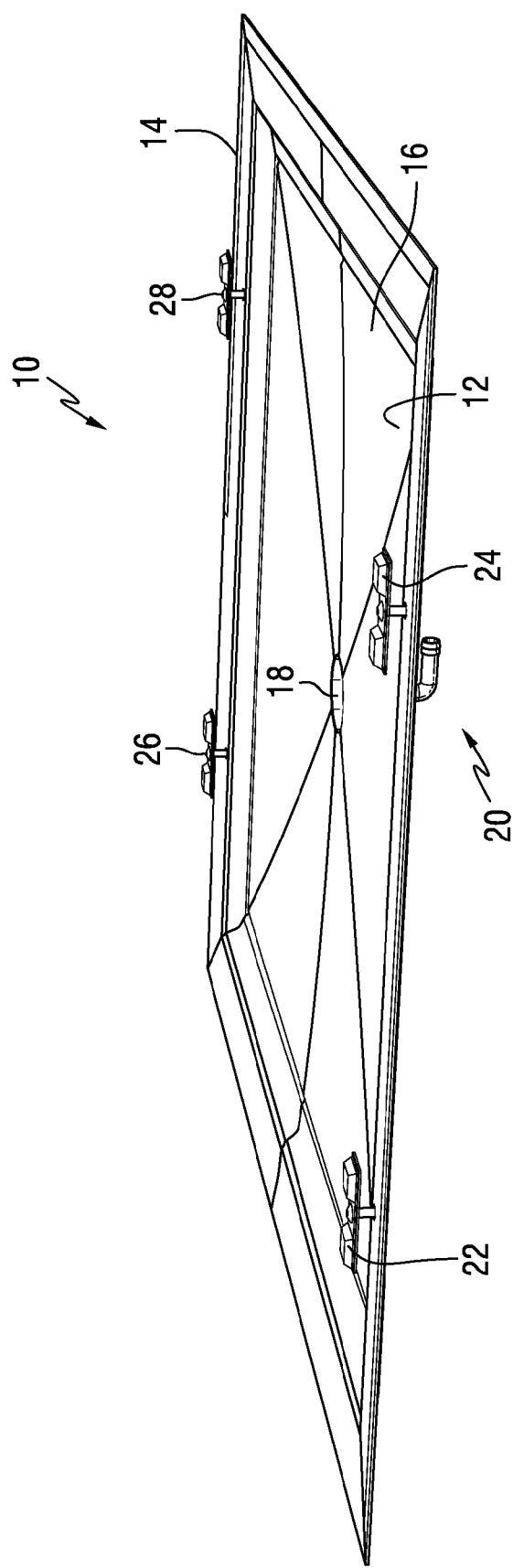
FIG. 1 is an isometric view of a leak diverter in accordance with an embodiment of the invention.

In one aspect, the present invention provides a leak diverter that can be used with a suspended ceiling, wherein installation of the leak diverter does not require removal of the ceiling panels, thereby expediting and simplifying the installation process. FIG. 1 is an isometric view of a leak diverter 10 in accordance with an embodiment of the invention. The leak diverter of FIG. 1 includes a liquid collection tray (also called a diverter pan) 12 having a raised frame or edge 14 around its perimeter, with an interior collection portion 16 that may be flat or sloped or otherwise contoured. The frame or raised edge may be integrally formed with the collection portion, or may be separately fabricated and attached or sealed to the collection portion. An opening or drain 18 is provided in the collection portion. A drain assembly 20 is attached adjacent to the drain opening and is configured to be connected to a hose or pipe.

The liquid collection tray can comprise a rigid, semi-rigid and/or flexible sheet of material or a preformed container. The flexible sheet and/or preformed container can comprise a polymeric material and/or a metal composition coated to prevent rust and/or corrosion. The liquid collection tray can have any suitable shape and size, such as substantially square or rectangular. For example, the liquid collection tray may be sized to approximate the dimensions of a ceiling panel, or it may be slightly larger than the ceiling panel.

The collection portion can be sloped from the frame toward the drain. The drain can be positioned at any desirable location, such as at the center of the collection portion.

In one embodiment, the diverter pan includes extended edges so that when hung, the diverter covers the ceiling tile and also extends at least ½ inch (1.27 mm) beyond the surrounding ceiling support grid to collect drips/leaks originating from the ceiling tile, the grid, and adjacent tile edges. For example, the edge can extend 1 inch (2.54 mm) beyond the centerline of the typical 9/16 inch (1.43 mm) wide grid.

The leak diverter may be attached to the underside of a leaking suspended ceiling system. The support grid of the suspended ceiling is typically made of a ferromagnetic material to which magnets will adhere. In various embodiments, the leak diverter is magnetically coupled to the support grid of the suspended ceiling using magnetic suspension assemblies. Four magnetic suspension assemblies 22, 24, 26 and 28 are illustrated in the embodiment of FIG. 1. However, more or fewer suspension assemblies could be used.

Figure 2:
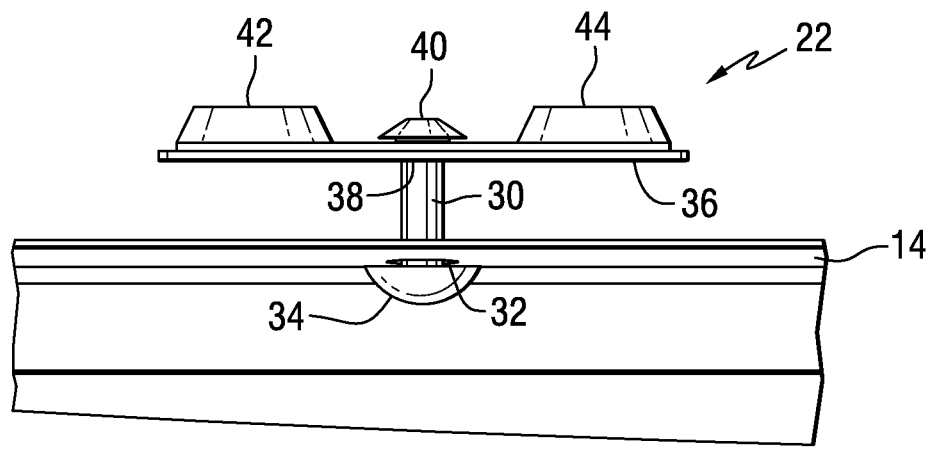
FIG. 2 is a side view of a magnetic suspension assembly of the leak diverter of FIG. 1.

FIG. 2 in an elevation view of one magnetic suspension assembly 22 of the leak diverter of FIG. 1. Suspension assembly 22 is shown to include a pin or tether 30 that passes through an opening 32 in the frame 14. The tether can be made of flexible material to account for any misalignments (e.g., up and down, side to side, unevenness) of the grid system to which the magnets are to be attached. Flexible tethers also act as shock absorbers to keep the magnets in tight contact with the grid, especially during rough handling while installing the diverter and the hose. The tethers can be made of rubber, synthetic rubber, silicone rubber, or any flexible polymer or other flexible material.

The tethers are preferably attached to the diverter pan and magnets through holes in both, and are retained by an enlargement or cap at the ends of the tethers. In the embodiment of FIG. 2, an enlargement 34 on the tether prevents the tether from sliding upward through the opening. A plate 36 is mounted on the tether and includes an opening 38 through which the tether passes. An enlargement 40 prevents the plate from sliding off of the tether.

Magnets 42 and 44 are mounted on top of, and at opposite ends of, the plate. In the illustrated embodiment, the tether can rotate with respect to the frame and the plate can rotate with respect to the tether. This allows the magnets to be moved to accommodate the location of the suspended ceiling grid to which the diverter is to be attached. In other embodiments, the tether could be fixed to the frame, with the plate being rotatable about the tether, or the plate could be fixed to the tether, with the tether being rotatable in an opening in the frame.

In one embodiment, the tethers separate the magnets from the diverter pan by approximately ¾ inch (1.90 mm). This allows the diverter to be used with ceiling tiles that have a reveal (i.e. the tile surface is below the grid system).

In various embodiments, the magnet suspension assemblies can include 1 or more individual magnets, and multiple magnets could be mounted together as a single unit. Preferably, each magnetic suspension assembly has a net magnetic pull force rating of about 10 pounds, with a minimum rating of 2 pounds. The contacting face width of each magnetic suspension assembly can be equal to or greater than ¼ inch (0.63 mm); and preferably ½ inch (1/27 mm) to fit between tiles that have a reveal below the supporting grid. The total magnetic pull force of the suspension assemblies for a diverter is preferably 40 pounds, with a minimum of 4 pounds. The magnetic suspension assemblies of FIGS. 1 and 2 are attached to the diverter pan via tethers. In alternative embodiments, the magnetic suspension assemblies can be attached via tethers to a separate component (e.g. an elongated clip) that is then attached to the diverter pan. In other embodiments, the diverter can be coupled to the ceiling support frame using magnets that are not attached to a tether.

Figure 3:
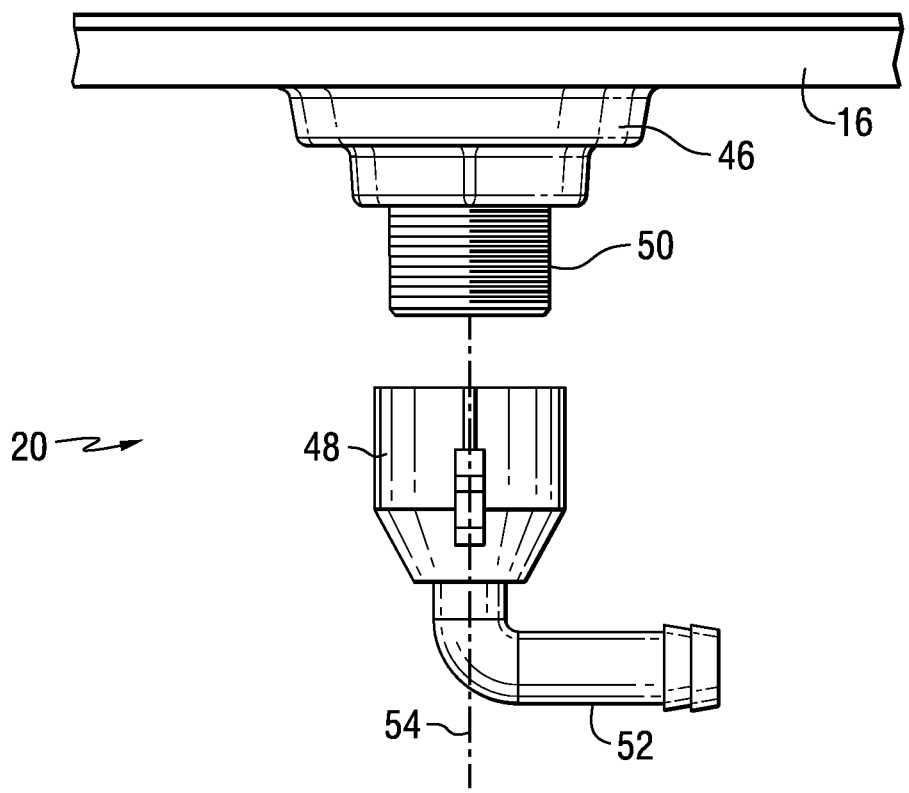
FIG. 3 is a side view of a drain assembly of the leak diverter of FIG. 1.

FIG. 3 is a side view of the drain assembly 20 of the leak diverter of FIG. 1. The drain assembly is shown to include a reducer bushing 46 that is attached to the collection portion 16 and a hose connector 48 that can be screwed onto a threaded portion 50 of the bushing. The connector includes an outlet tube 52 that can swivel around a central axis 54 such that the tube can be positioned in a desired orientation after the leak diverter is coupled to the suspended ceiling.

Figure 4:
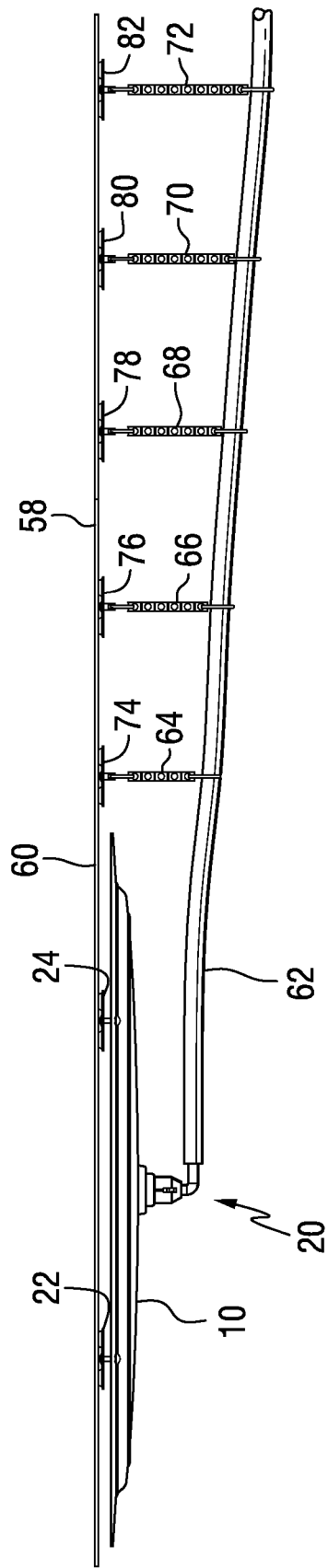
FIG. 4 is a side view of a leak diverter and drain hose coupled to a suspended ceiling.

FIG. 4 is a side view of the leak diverter 10 of FIG. 1 coupled to a suspended ceiling 58. Magnetic suspension assemblies 22 and 24 are shown to be attached to a support grid 60. A hose 62 that is connected to the drain assembly 20 is supported by a plurality of adjustable flexible hose hangers 64, 66, 68, 70 and 72. The hangers include magnetic attachment assemblies 74, 76, 78, 80 and 82 that can be magnetically coupled to the support grid. The drain hose 62 can be connected to any suitable discharge system capable of removing collected liquid from the diverter and passing it to a removal device, such as a collection tank or a building drain.

The drain hose in the embodiment of FIG. 4 is attached to the drain pan with an elbow fitting that is freely rotatable as to allow easy adjustment of the hose direction.

The adjustable flexible hose hangers allow the drain hose to be run along the ceiling before dropping vertically to the fluid collection point. Magnetic hangers also allow for easy and quick installation and removal of the drainage hose.

Figure 5:
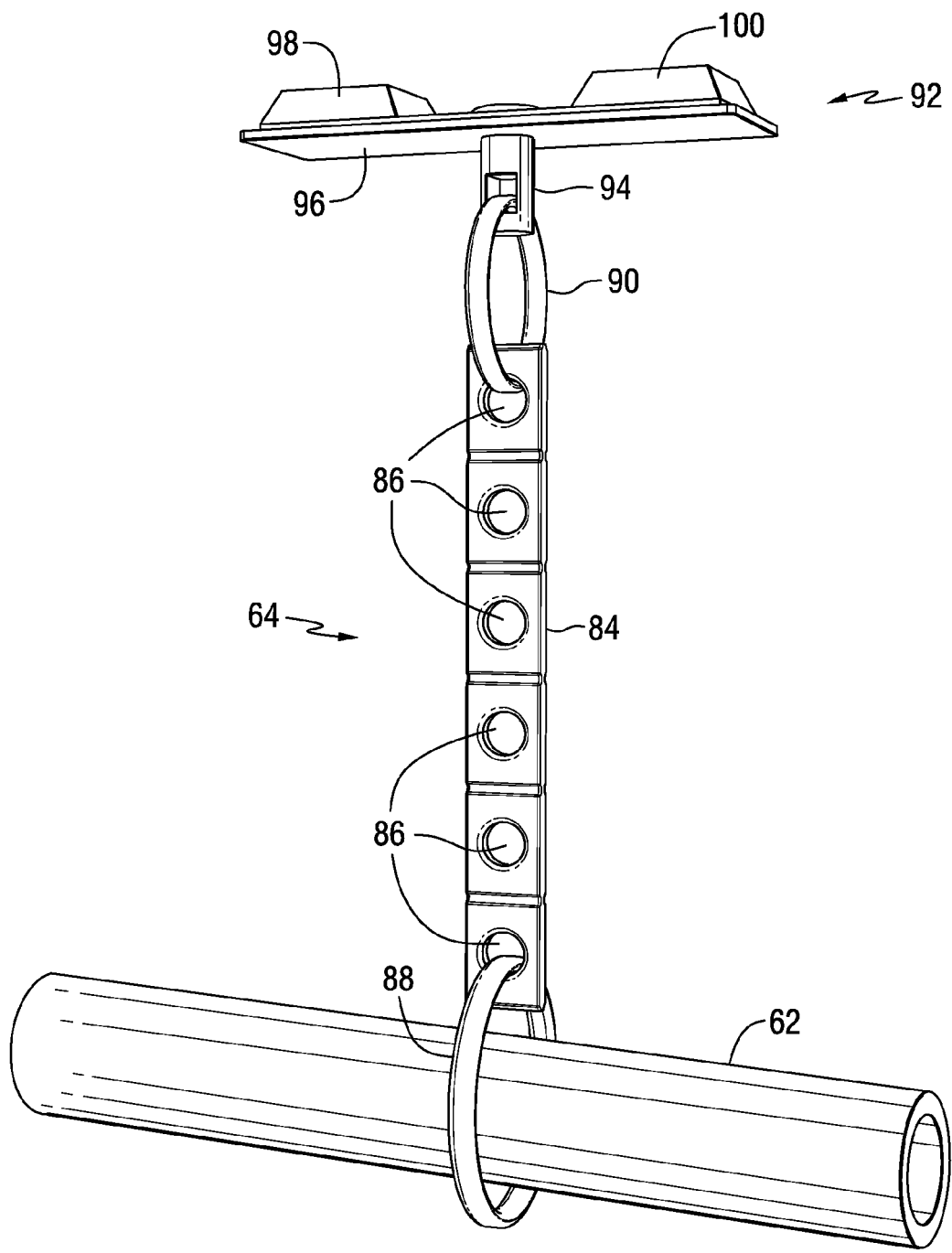
FIG. 5 is a side view of a hanger.

FIG. 5 is a side view of a hanger 64. The hanger includes a strap 84 having a plurality of openings 86. A first ring 88 passes through one of the openings and is structured to encompass the hose 62. A second ring 90 passes through one of the openings and is structured to connect the strap to a magnetic attachment assembly 92. The magnetic attachment assembly includes a pin 94 and a plate 96 that can be pivotally coupled to the pin. Magnets 98 and 100 are mounted at opposite ends of the plate. The length of the hanging straps can be adjustable by selecting different openings for the rings to allow a slight downward slope of the draining hose to facilitate drainage.

When the diverter is to be mounted to a suspended ceiling having a leak, removal of the wet ceiling tile is optional as the diverter can be attached directly below the leaking portion. An installation option is to poke a simple drainage hole in the ceiling tile. One application of the leak diverter is for use as a temporary device fix, until a final repair can be made. If, however, the diverter is constructed in an aesthetically pleasing design, the diverter may alternately be left in place long term. When one wishes to remove the ceiling tile for a final repair, since the diverter is mounted under the ceiling tile, any residual liquid is easily controlled.

In various embodiments, the magnetic suspension assemblies may be integral parts of the diverter, or in other embodiments, the magnetic suspension assemblies can be incorporated into a device that can be attached to the leak diverter at various positions.

Figure 6:
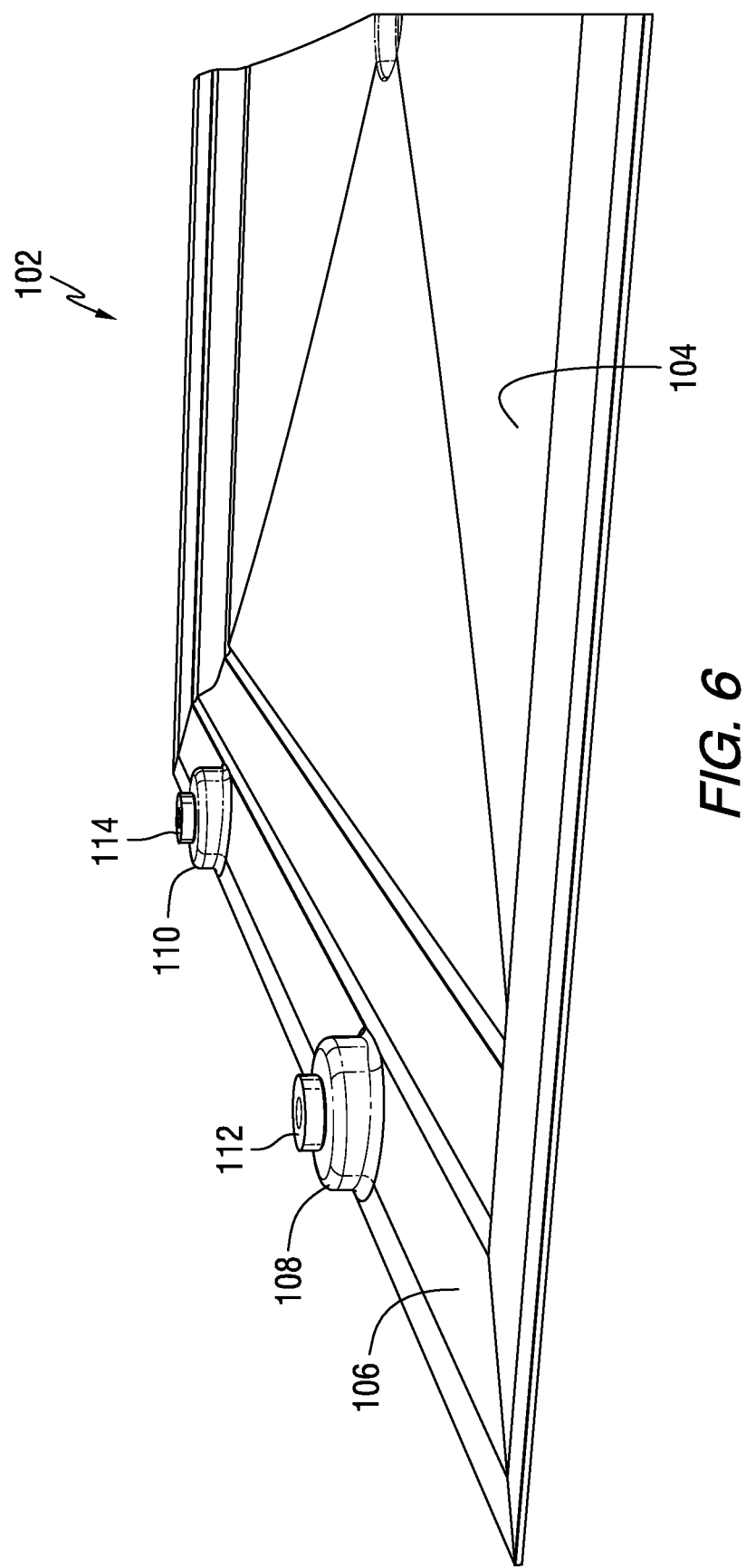
FIG. 6 is an isometric view of a portion of a leak diverter with another magnetic suspension assembly.

FIG. 6 is an isometric view of a portion of an embodiment of a leak diverter 102 with another magnetic suspension assembly. In the embodiment of FIG. 6, a frame 104 of the diverter pan 106 includes raised sections 108, 110. Magnets 112, 114 are mounted on the raised sections. The magnets can then be used to couple the leak diverter to the suspended ceiling grid. While only two raised sections and magnets are shown in FIG. 6, additional raised sections and magnets can be positioned on the frame to provide additional suspended ceiling grid attachment points.

Figure 7:
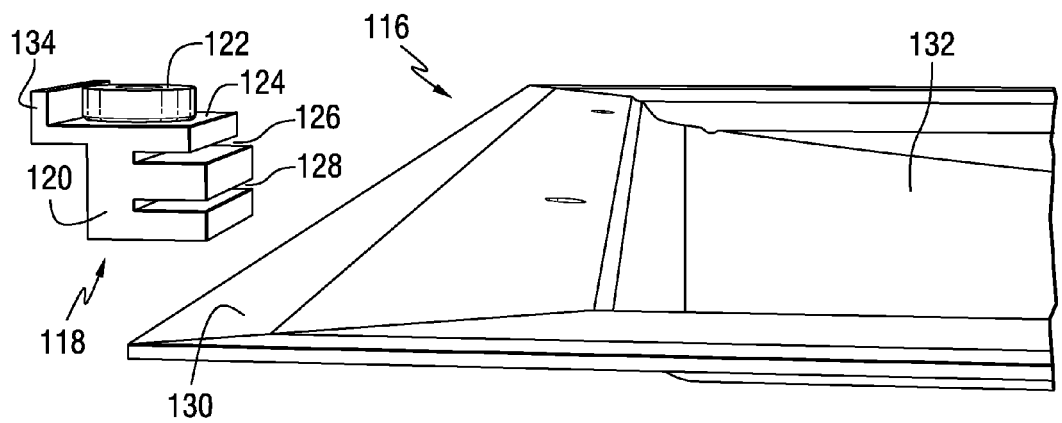
FIG. 7 is an isometric view of a portion of a leak diverter with a magnetic attachment clip.

FIG. 7 is an isometric view of a portion of an embodiment of a leak diverter 116 with a suspension assembly in the form of a magnetic attachment clip 118. The clip includes a clip body 120 and a magnet 122 mounted on an upper surface 124 the clip body. The clip body includes two slots 126, 128 that are configured to accept a portion of the frame 130 of the diverter pan 132. The slots are spaced from each other in a vertical direction to allow for mounting of the diverter pan at different distances from the suspended ceiling. A raised portion 134 of the clip can contact the suspend ceiling or the suspended ceiling grid to prevent the clip from tilting toward the diverter pan when the clip is mounted to the ceiling grid. While only one clip is shown in FIG. 7, it should be apparent that a plurality of clips can be positioned at different locations on the frame to support the diverter pan.

Figure 8:
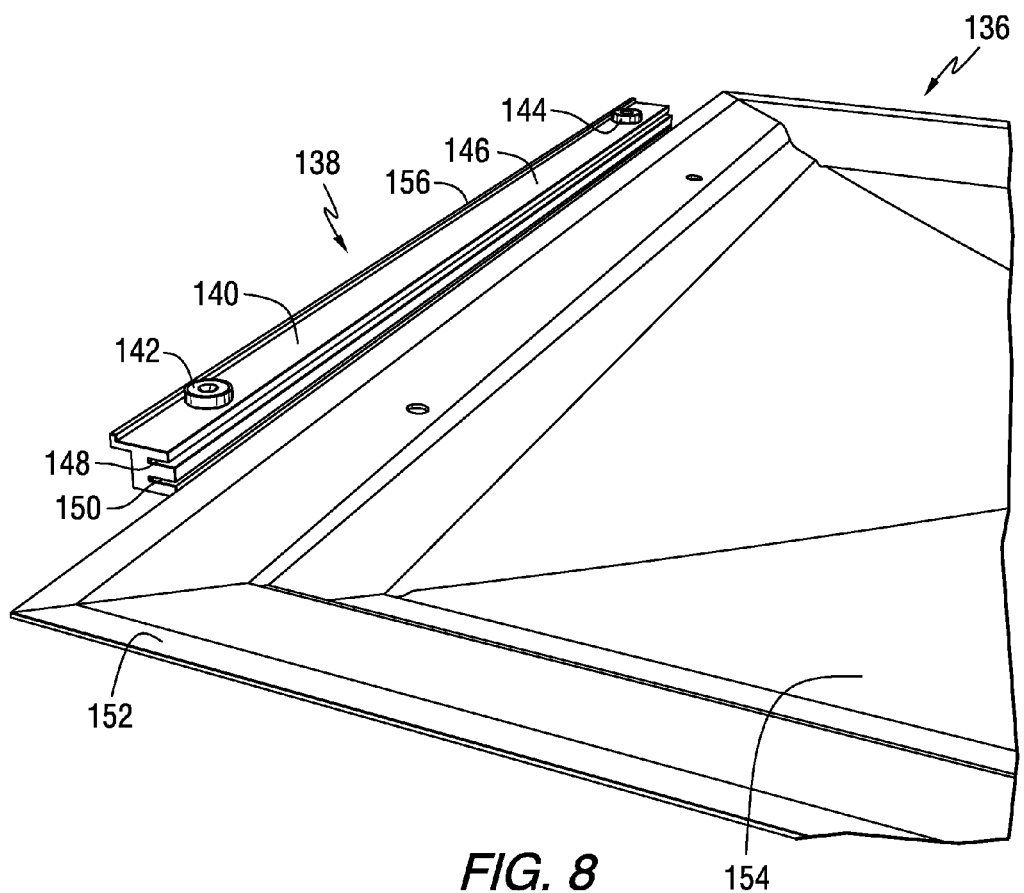
FIG. 8 is an isometric view of a portion of a leak diverter with another embodiment of a magnetic attachment clip.

FIG. 8 is an isometric view of a portion of an embodiment of a leak diverter 136 with a suspension assembly in the form of an elongated magnetic attachment clip 138. The clip includes a clip body 140 and magnets 142, 144 mounted on an upper surface 146 the clip body. The clip body includes two slots 148, 150 that are configured to accept a portion of the frame 152 of the diverter pan 154. The slots are spaced from each other in a vertical direction to allow for mounting of the diverter pan at different distances from the suspended ceiling. A raised portion 156 of the clip can contact the suspend ceiling or the suspended ceiling grid to prevent the clip from tilting toward the diverter pan when the clip is mounted to the ceiling grid. While only one clip is shown in FIG. 8, it should be apparent that additional clips can be positioned at different locations on the frame to support the diverter pan.

FIG. 9 is a side view of another embodiment of a leak diverter 160 with another magnetic suspension assembly. FIG. 10 is an isometric view of a portion of the suspension assembly of FIG. 9, without the leak diverter. The suspension assembly includes a first U-shaped support 162 having a generally flat base 164 and raised portions 166, 168 extending from the base. Magnets 170, 172 are mounted on the raised portions and configured to magnetically couple the support to a suspended ceiling grid 174. When the U-shaped support is coupled to the ceiling grid, a flange 190 of the diverter pan 176 rests on a surface 178 of the base 164. FIG. 10 shows a second U-shaped support 180 having a generally flat base 182 and a raised portion 184 adjacent to an end of the base. A magnet 186 is mounted on the end portion and couples the support to the ceiling grid. When the U-shaped support 180 is coupled to the ceiling grid, a flange 190 of the diverter pan 176 rests on a surface 188 of the base 182.

Ceiling tiles are typically 2 feet×2 feet, 2 feet×4 feet, or their metric equivalent, except around the perimeter of the ceiling where they are cut down in size to fit in those positions where the support grid may not form uniform openings for the tiles. A benefit of using magnetic suspension assemblies or clips is that the diverter does not need to be centered directly under a tile, and can be placed tightly against a wall or other obstacle. The installer has the ability to adjust the magnets' or clips' location to match the surrounding suspension grid dimensions.

The leak diverters of this invention can be structured and arranged such that they can hang below the suspended ceiling. Since the diverter pan is attached to the ceiling with magnets, it does not need to be centered under a ceiling tile. It can span a ceiling supporting grid and/or be set up against the wall where the ceiling tiles are typically cut undersize to fit.

The components of the diverter may be made of any suitable materials such as plastic and/or metal.

Whereas particular embodiments of this invention have been described above for purposes of illustration, it will be evident to those skilled in the art that numerous variations of the details of the present invention may be made without departing from the invention as defined in the appended claims.

What is claimed is:

1. A leak diverter comprising:
a liquid collection tray structured and arranged to be positioned below and supported by a suspended ceiling;
a drain in flow communication with the liquid collection tray; and
a plurality of magnetic suspension assemblies connected to the liquid collection tray, the magnetic suspension assemblies being structured and arranged to magnetically couple the leak diverter to a support frame in the suspended ceiling;
wherein at least one of the magnetic suspension assemblies comprises:
a tether connected to the liquid collection tray; and
a first magnet coupled to the tether.

2. The leak diverter of claim 1, wherein the at least one magnetic suspension assembly further comprises:
a second magnet; and
a plate pivotally coupled to the tether, wherein the first and second magnets are mounted on the plate.

3. The leak diverter of claim 1, wherein the tether of the at least one magnetic suspension assembly passes through a hole in the support frame.

4. The leak diverter of claim 1, wherein the tether is flexible.

5. A leak diverter comprising:
a liquid collection tray structured and arranged to be positioned below and supported by a suspended ceiling;
a drain in flow communication with the liquid collection tray; and
a plurality of magnetic suspension assemblies connected to the liquid collection tray, the magnetic suspension assemblies being structured and arranged to magnetically couple the leak diverter to a support frame in the suspended ceiling;
wherein at least one of the magnetic suspension assemblies comprises:
a clip including a clip body and a first magnet mounted on the clip body, wherein the clip body defines a first slot configured to accept a portion of a frame of the collection tray.

6. The leak diverter of claim 5, wherein the clip body defines a second slot configured to accept a portion of a frame of the collection tray, the first and second slots being spaced from each other in a vertical direction.

7. The leak diverter of claim 5, further comprising:
a second magnet mounted on the clip body.

8. The leak diverter of claim 5, wherein the first magnet is mounted on a top surface of the clip body and the clip body includes a projection extending from the top surface.

9. A leak diverter comprising:
a liquid collection tray structured and arranged to be positioned below and supported by a suspended ceiling;
a drain in flow communication with the liquid collection tray; and
a plurality of magnetic suspension assemblies connected to the liquid collection tray, the magnetic suspension assemblies being structured and arranged to magnetically couple the leak diverter to a support frame in the suspended ceiling;
wherein at least one of the magnetic suspension assemblies comprises:
a U-shaped support and first and second magnets coupled to the U-shaped support, wherein the U-shaped support includes a surface configured to support a portion of the liquid collection tray.

10. A leak diverter system comprising:
- a liquid collection tray structured and arranged to be positioned below and supported by a suspended ceiling;
- a drain in flow communication with the liquid collection tray;
- a plurality of attachment devices structured and arranged to attach the liquid collection tray to a support frame in the suspended ceiling;
- a drain hose connected to the drain; and
- a hanger structured and arranged to suspend the drain hose from the suspended ceiling, the hanger including a magnet structured and arranged to magnetically couple the hanger to a support frame in the suspended ceiling;
- wherein at least one of the attachment devices comprises:
  - a tether connected to the liquid collection tray; and
  - a first magnet coupled to the tether.

11. The leak diverter system of claim 10, wherein the at least one attachment device further comprises:
- a second magnet; and
- a plate pivotally coupled to the tether, wherein the first and second magnets are mounted on the plate.

12. The leak diverter system of claim 10, wherein the tether of the at least one attachment device passes through a hole in the support frame.

13. The leak diverter system of claim 10, wherein the tether is flexible.

* * * * *